July 26, 1960   L. A. BAKER   2,946,149
WEEDLESS FISHING SPOON
Filed Feb. 10, 1958
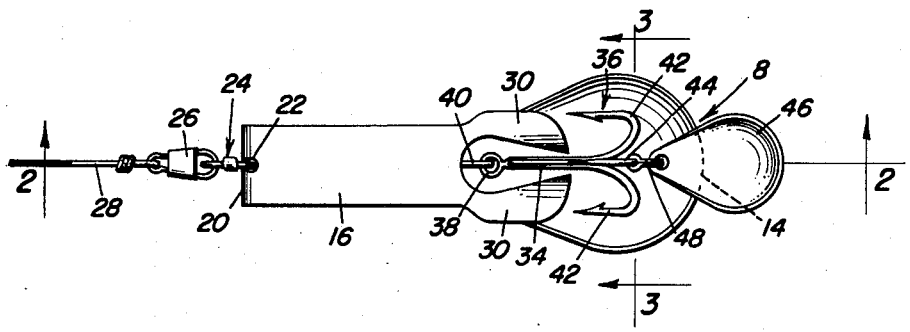
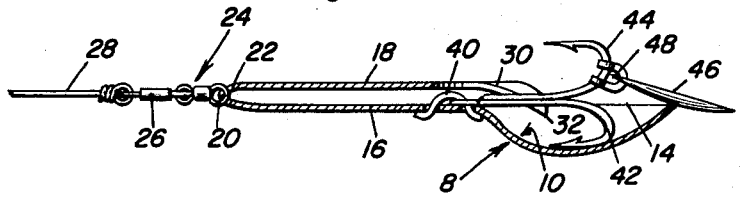
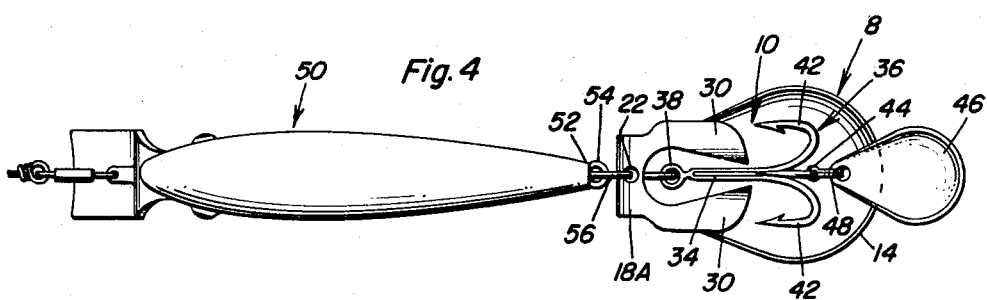
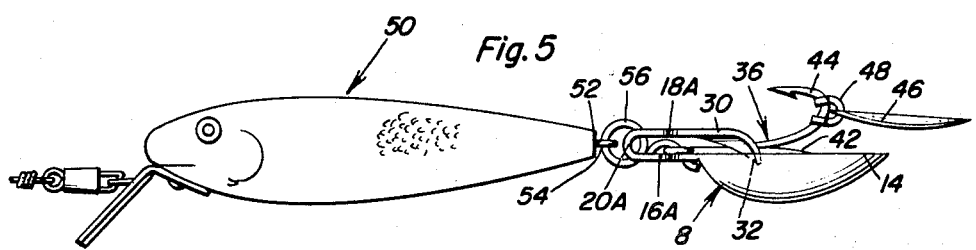
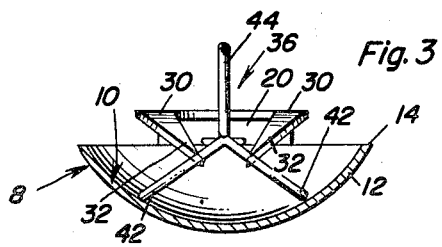
Lester A. Baker
INVENTOR.

United States Patent Office 2,946,149
Patented July 26, 1960

2,946,149
WEEDLESS FISHING SPOON
Lester A. Baker, 3235 Redding Road, Columbus, Ohio
Filed Feb. 10, 1958, Ser. No. 714,382
1 Claim. (Cl. 43—42.18)

This invention relates to an improved weedless fishing spoon expressly designed and constructed for expedient casting and trolling and which is highly practical and desirable in that it is anti-fouling and consequently effectual in serving the needs of users thereof.

Lures, such as plugs, spinners, spoons and the like, are often expensive and some styles and types, not easy or convenient to replace, are treasured by the owner. However, when fishing in certain worthwhile areas laden with obstacles and obstructions such as stumps, limbs and debris, generally speaking, the fishhooks carried by a lure snag and anchor themselves preventing the lure from being retrieved. Therefore, one object of the instant endeavor is to enable a fisherman to strip a plug, for example, of the customarily attached fishhooks, to couple my novel hook-equipped spoon to the trailing end of the plug, and to fish in otherwise hazard-filled water but with the assurance that he will get results without losing the plug.

Although the invention is adapted to function as a lure trailing and protecting attachment, it is also capable of practical and efficient use alone in that it constitutes a lure in and of itself, more particularly, a weedless lure. To this end the invention features a relatively deep-bowl-spoon made of aluminum and is therefore rust-proof and attractive and requires no painting or special coatings or added decorations. In the improved combination, the spoon is not merely a lure, it is a cup-like receptacle and holder for two of the barbed hooks or prongs of a treble hook, said prongs seating themselves in such a manner that the spoon, operating with the concave side up, provides a unique shield and hides the baited hooks, thus luring fish and insuring better and resultful fishing.

In the invention disclosed, repeated use has shown that although the treble hook is free to function it invariably returns to the receptacle or bowl under virtually all fishing conditions. Also, and adding to the efficiency of the device, a relatively small shiny spinner blade is used. This blade is hitched, by way of its customary clevis, to the return-bend of the top prong and extends slightly to the rear of the spoon, functioning as a simple drag and greatly assists in maintaining the treble hook in its normal position of repose in the above-mentioned bowl.

Another objective has to do with a spoon having a forwardly extending shank which is doubled upon itself, the upper limb thereof extending above the bowl and the free bifurcated end inclining into the forward end portion of the bowl. The furcations are employed as guard fingers, straddle the shank of the hook, and prevent the hook from losing its intended normal seated position in the bowl.

Features and advantages not given above will become apparent in reading the specification in conjunction with the illustrative views of the drawing.

In the drawing:

Fig. 1 is a top plan view of the improved weedless fishing spoon.

Fig. 2 is a section on the longitudinal line 2—2 of Fig. 1.

Fig. 3 is an enlarged cross-section on the line 3—3 of Fig. 1.

Fig. 4 is a plan view showing a slightly modified weedless fishing spoon used in conjunction with a plug or an equivalent artificial lure.

Fig. 5 is a side elevation of the structure covered in Fig. 4.

With reference first to Figs. 1 to 3 inclusive the aluminum or equivalent deep-bowl-spoon is denoted by the numeral 8, the concave or bowl side being denoted at 10 and the convex or bottom side at 12. The brim or marginal edge portions are denoted at 14. As before mentioned the spoon is preferably provided at its forward or front end with an integral elongated shank which is bent upon itself intermediate its ends to define a lower leg or limb 16 coplanar with the edges 14 and an upper spaced parallel leg or limb 18. The bent portion 20 is provided with aligned holes 22 to permit attachment of a swivel 24 with which the fastener 26 for the fishing line 28 is connected. The rearward end portion of the upper limb 18 overlies the forward portion of the spoon and is bifurcated with the rearwardly convergent furcations 30 inclined and dipping, so to speak, into the receptacle or bowl. As a matter of fact, the furcations constitute guard fingers and their terminal ends are preferably gradually narrowed and are approximately V-shaped in plan with the tip portions 32 downwardly curved and longitudinally twisted and (Fig. 3) residing in but spaced from the concave or bowl side 10. These constitute guard fingers and straddle the shank 34 of the treble or gang hook 36. The eye 38 on the forward end of the shank is hingedly or pivotally connected to a U-shaped clip 40 which is mounted at the juncture of the spoon and shank as seen in Fig. 2 and which provides satisfactory operating connection between the treble hook, shank and spoon. Under normal operating conditions the two lower barbed prongs 42 rest in the bottom of the bowl.

The third or top prong 44 assumes a position projecting above the plane of the edges 14. The aforementioned relatively small shiny and attractive spinner blade 46 is connected with the usual clevis 48 and the clevis in this instance is mounted on the return bent portion of the prong 44. What may be described as the normal position of the spinner is that on an inclined drag with a median portion resting atop the rear end of the spoon and with a major portion projecting downwardly and rearwardly beyond the spoon (Fig. 2). The spinner has freedom of play however and in its diversified action contributes to the over-all attractiveness of the spoon.

It will be evident from the description so far of Figs. 1 to 3 that this weedless spoon is intended to be used by itself. On the other hand, it is equally well adapted for use in conjunction with an artificial lure. The form of lure most usually employed to advantage in connection with the invention is a plug, for example the minnow-like plug 50 of Figs. 4 and 5. By attaching the weedless spoon to the plug the usual hooks (not shown) can be dispensed with. That is to say, the weedless spoon, as an attachment may be connected to the trailing end 52 by way of the eye 54 and ring-like link 56. Except for the length of the shank seen in Figs. 1 to 3 the attachment appearing in Figs. 4 and 5 is identical in construction. In the circumstances the "attachment" is thought not to constitute a modification of the inventive concept. In these circumstances it is thought that it will simplify the disclosure here to denote the components of the attachments of Figs. 4 and 5 by the same reference numerals already used in connection with Figs. 1 to 3 inclusive. All that is necessary to mention is that the lower limb 16a (Fig. 5) is short compared to the limb 16. The bent portion 20a is the same as 20 and the upper limb 18a the same except as to dimension. The rest of this structure is as already described and like reference numerals apply to like parts throughout the views.

In the experimental models the cup-type spoon was originally a measuring spoon. It was selected because it always sinks open side up. Being made of aluminum it will not rust and will always stay attractive and requires no painting. The treble hook was chosen because the hooks rest satisfactorily in the cup with the top hook up. With the construction shown, the hooks are free but always return to the spoon under all conditions. It is virtually impossible for the hooks to get back of the spoon. The spinner blade on the hooks makes it drag in the water and "pulls" the hooks in the spoon. The guard fingers prevent the hooks from slipping over the side edges of the spoon.

Since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A fishing device comprising: a generally U-shaped shank including substantially flat upper and lower legs, a concavo-convex spoon integral with the free end of said lower leg, a hook pivotally connected to said lower leg and freely swingable in the spoon, furcations integral with the free end of the upper leg and straddling the shank of said hook for limiting the lateral swinging movement of said hook in the spoon, said hook being swingable into and out of the spoon between the furcations, said furcations being rearwardly convergent and terminating in downwardly bent, longitudinally twisted free end portions projecting into the spoon for guiding the hook thereinto and, in conjunction therewith, preventing the escape of the hook from between said furcations, and a drag for the hook comprising a spinner loosely connected thereon and adapted to rest on the rear end portion of the spoon when inactive.

References Cited in the file of this patent

UNITED STATES PATENTS

| | | |
|---|---|---|
| 1,888,641 | Toepper | Nov. 22, 1932 |
| 2,281,809 | Smith | May 5, 1942 |
| 2,567,813 | Hyland | Sept. 11, 1951 |
| 2,611,208 | Alexath | Sept. 23, 1952 |
| 2,731,757 | Porth | Jan. 24, 1956 |